(12) United States Patent
Attia et al.

(10) Patent No.: US 11,739,273 B2
(45) Date of Patent: Aug. 29, 2023

(54) PROCESS FOR REMOVING METALS IN PETROLEUM OIL USING AN ORGANOPHOSPHORUS COMPOUND AND MICROWAVES

(71) Applicant: GREENOVEL INC., Saint-Constant (CA)

(72) Inventors: Mai Attia, Saint-Constant (CA); Sherif Farag, Saint-Constant (CA); Jamal Chaouki, Dorval (CA)

(73) Assignee: GreeNovel Inc., Saint-Constant (CA)

( * ) Notice: Subject to any disclaimer, the term of this patent is extended or adjusted under 35 U.S.C. 154(b) by 0 days.

(21) Appl. No.: 17/250,858

(22) PCT Filed: Nov. 9, 2019

(86) PCT No.: PCT/CA2019/051602
§ 371 (c)(1),
(2) Date: Mar. 12, 2021

(87) PCT Pub. No.: WO2020/093175
PCT Pub. Date: May 14, 2020

(65) Prior Publication Data
US 2022/0033715 A1    Feb. 3, 2022

Related U.S. Application Data

(60) Provisional application No. 62/758,227, filed on Nov. 9, 2018.

(51) Int. Cl.
| | | |
|---|---|---|
| *C10G 17/04* | (2006.01) |
| *C10G 21/16* | (2006.01) |
| *C10G 21/20* | (2006.01) |
| *C10G 21/24* | (2006.01) |
| *C10G 21/28* | (2006.01) |
| *C10G 32/02* | (2006.01) |

(52) U.S. Cl.
CPC ............. *C10G 17/04* (2013.01); *C10G 21/20* (2013.01); *C10G 32/02* (2013.01); *C10G 2300/205* (2013.01); *C10G 2300/4081* (2013.01)

(58) Field of Classification Search
CPC ........ C10G 17/04; C10G 21/16; C10G 21/20; C10G 21/24; C10G 21/28; C10G 32/02; C10G 2300/205
See application file for complete search history.

(56) References Cited

U.S. PATENT DOCUMENTS

| | | | | |
|---|---|---|---|---|
| 4,287,051 A | * | 9/1981 | Curtin ................... | C10G 67/08 208/326 |
| 5,411,651 A | * | 5/1995 | Yamaguchi ............. | C02F 1/465 204/666 |
| 6,068,737 A | * | 5/2000 | De Chamorro .......... | C10L 9/08 44/624 |

FOREIGN PATENT DOCUMENTS

CN    102443422 A  *  5/2012

OTHER PUBLICATIONS

Chu, CN 102443422 A, English translation (May 9, 2012).*

(Continued)

*Primary Examiner* — Randy Boyer
(74) *Attorney, Agent, or Firm* — Lavery, De Billy, LLP

(57) ABSTRACT

A process for removing metals in a petroleum oil material. The process comprises causing the petroleum oil material to react with a removing agent which comprises a phosphoric acid ester. A microwave irradiation environment was created during the reaction to provide the required energy essential for separating such contaminations from the oil chemical network. The process of the invention is applied at ambient pressure and low temperature compared to the conventional metal removal processes. The process of the invention can be readily scaled up and integrated into an industrial facility.

14 Claims, 10 Drawing Sheets

(56) References Cited

OTHER PUBLICATIONS

Kappe, C.O., Controlled Microwave Heating in Modern Organic Synthesis; Angew. Chem. Int. Ed. 2004, 43, 6250-6284.

Jiaxi, X., Microwave Irradiation and Selectivities in Organic Reactions; Progress in Chemistry-Beijing, 2007. 19(5): p. 700, Abstract Only.

Dudlley et al., On the Existence of and Mechanism for Microwave-Specific Reaction Rate Enhancement; Chem. Sci., 2015, 6, 2144.

Chen et al., Parameters Affecting the Microwave-Specific Acceleration of a Chemical Reaction; The Journal of organic chemistry, 2014. 79(16): p. 7425-7436.

Rosana et al., Microwave-Specific Acceleration of a Friedel-Crafts Reaction: Evidence for Selective Heating in Homogeneous Solution; The Journal of organic chemistry, 2014. 79(16): p. 7437-7450.

Wang et al., Effect of the Cationic Starch on Removal of Ni and V from Petroleum Oils under Microwave Irradiation; Fuel, 201 1. 90: p. 987-991.

Shang et al., Microwave-assisted nickel and vanadium removal from petroleum oil. Fuel Processing Technology, 2016. 142: p. 250-257.

Beach et al., The Nature of Vanadium in Petroleum; Industrial & Engineering Chemistry, 1957. 49(7): p. 1157-1 164.

Mandai et al., Non-Catalytic Vanadium Removal from Vanadyl Etioporphyrin (VO-EP) Using a Mixed Solvent of Supercritical Water and Toluene: A Kinetic Study; Fuel, 2012. 92(1): p. 288-294.

Sombral et al.,Study on Nickel and Vanadium Removal in Thermal Conversion of Oil Sludge and Oil Shale Sludge; Journal de Physique IV (Proceedings). 2003. EDP sciences.

Awokoya et al., Molecularly Imprinted Electrospun Nanofibers for Adsorption of Nickel-5, 10, 15, 20-Tetraphenylporphine (NTPP) in Organic Media+B15; Journal of Polymer Research, 2013. 20(6): p. 1-9.

Sen et al., Fluorescence and FTIR Spectra Analysis of Trans-A2B2-Substituted Di- and Tetra-Phenyl Porphyrins; Materials. 2010;3(8):4446-75.

* cited by examiner

PROCESS FOR REMOVING METALS IN PETROLEUM OIL USING AN ORGANOPHOSPHORUS COMPOUND AND MICROWAVES

CROSS REFERENCE TO RELATED APPLICATIONS

This application claims benefit of U.S. Provisional Patent Application No. 62/758,227, filed on Nov. 9, 2018, the content of which is incorporated herein in its entirety by reference.

FIELD OF THE INVENTION

The present invention relates generally to processes for treating petroleum oil. More specifically, the invention relates to a process for removing metals in petroleum oil. The process according to the invention uses electromagnetic waves to provide the reaction with the heat energy required for metals separation from the petroleum oil. The process according to the invention may be readily scaled up and integrated to industrial facilities.

BACKGROUND OF THE INVENTION

Petroleum oil is experiencing a considerable challenge due to the presence of metals. Metals, especially vanadium (V) and nickel (Ni), are present in the oil in stable sets of organometallic compounds, called metalloporphyrines FIG. 1.

The porphyrins exist in different patterns and are quite soluble in oil, which, in turn, augments the difficulty in eliminating them from petroleum oil. The presence of these impurities causes several health issues if the oil is used as fuel. One of the most harmful metals is V, which spreads to the surrounding area in the form of vanadium oxide and, thus, causing various types of bodily irritations. Ni in the form of nickel carbonyl reacts in the body as well, causing numerous types of neoplastic diseases.

Serious Various approaches have been published in the literature, such as solvent extraction, distillation, visbreaking and coking, applying a demetallization agent, and hydrodemetallization are the most common attempts to upgrade petroleum oil by extracting both metals from the oil. Each technique faces several issues that can impede its objective in the industrial scale. For example, the solvent extraction process demands an enormous amount of solvent and discards the whole metalloporphyrin ring, which reduces the treated oil yield at the end of the process. Distillation produces oil with a lower concentration of impurities and another with a higher concentration. Most of the demetallization agents that have been applied are acids and not capable of removing the metals selectively. They remove the whole fraction containing the metals instead of only the metals.

Almost all the demetallization agents require an emulsification process to be blended well with the oil, which raises the cost of the operation. Hydrodemetallization techniques have been practiced in the industry. However, such processes are costly, as extreme temperature and pressure conditions, and an excessive volume of hydrogen are required for the reaction. Furthermore, the existence of the catalyst in this technique is a must, although it rapidly deactivates in a minimal period.

Applying microwave heating in chemical reactions was discovered recently. It was noted that addressing the microwave heating techniques provided several advances, such as reaction acceleration, higher yield, and various selectivity. Microwave can also enforce some synthetic reactions that cannot be achieved by superficial heating techniques[1-4]. Microwave heating reduces energy consumption due to the high heating selectivity [5-7], avoids heat transfer limitations, improves process flexibility and equipment portability, and is environmentally friendly, especially when clean electricity is used.

Employing microwave heating in chemical reactions demonstrates considerable superiority over the superficial heating technique, as it enhances the metals removal from the petroleum oil at a relatively significantly low bulk temperature compared to the superficial heating mechanism.

To successfully introduce microwave heating in a process, at least one of the target materials must be an excellent microwave receptor. Fortunately, most of metals, such as V and Ni, have extremely high interaction with microwaves, which should facilitate the use of technology in the demetallization applications.

Various attempts have been made to introduce the microwave heating mechanism in the extraction of metals from petroleum oil. Chamorro et al. have used the microwave heating technique to reduce the concentration of both metals and sulfur in a carbonaceous material [8]. The material was blended with an acidic compound or a mixture of acids, such as HNO3, $H_2SO_4$, HCL, $HCLO_4$, $H_3PO_4$, and HF, then the mixture was exposed to microwave irradiation. The process took place at a time between 10 sec. and 1 hour, and at a pressure not exceeding 200 psig, to avoid the evaporation of the reaction components. The removal ration for both Ni and V reached 80% and 99%, respectively, in 15 min.

Cationic starches have been tested as a demetallization agent for the removal of both Ni and V from petroleum oil under the effect of the microwave heating technique. It was demonstrated that increasing the degree of cationic substitution of cationic starches leads to enhancing the removal efficiency of heavy metals. The optimum reaction conditions for the removal of both Ni and V are 200 mg/L of cationic starch 4 (CS4) with a microwave power of 300 W for a residence time of 5 min. The removal efficiency of Ni when applying the above conditions for Iran and Shengli petroleum oil was 55% and 60%, respectively, and in the case of V, it was 76% and 79%, respectively [9].

Microwave assisted Ni and V removal form petroleum oil have been studied by Hui Shang et. al. the authors have used methansulfonic acid as a demetallization agent for Ni and V extraction for petroleum oil under the effect of Microwave heating technique. The most optimum reaction conditions are 2% demetallization agent, microwave power of 600-800 W, and irradiation time of 3 min. it was found that the maximum removal efficiency of Ni reached up to 83% and for V is 87% [10]. An emulsification process is a must in the process, which uses a high shear emulsifying machine at a certain agent/oil ratio.

As can be seen, although the removal of metals from petroleum oil has received considerable attention, there is still a need for processes to eliminate or reduce almost all the hazardous metals, particularly Ni and V, using a novel demetallization agent (DMA) under the effect of the microwave heating mechanism.

The process of this invention is green since no consumption of solvents is required. The process is cost-effective because no alternative emulsification processes are needed, such as the emulsification process for mixing the agent with the petroleum oil. The process also is less energy consumption, since the interaction of metals and the DMA with the microwave enhance the selective removal of metals; while, the whole oil is at very low temperature. On top of that, the process is not limited to the extraction of V and Ni, instead it can remove more than 36 elements form the oil.

SUMMARY OF THE INVENTION

The inventors have designed and conducted a process for removing metals and impurities from a petroleum oil material. The process according to the invention uses a metal removing agent which is a demetallization (DM) agent. The demetallization agent (DMA) according to the invention comprises a phosphoric acid ester. The process according to the invention uses a microwave heating technique.

In embodiments of the invention, the DMA is suitable for also removing other impurities present in the petroleum oil. In embodiments of the invention, the DMA is miscible to the petroleum oil. In embodiments of the invention, the DMA comprises a phosphoric acid ester.

In embodiments of the invention, the reacted DMA may be further treated such as to recover DMA which is re-used in the process. Also, any unreacted DMA may be recovered and re-used in the process.

The process of the invention can be readily scaled up and integrated in an industrial facility.

The invention thus provides the following in accordance with aspects thereof:
(1) A process for removing metals in a petroleum oil material, comprising causing the petroleum oil material to react with a removing agent which comprises a phosphoric acid ester
(2) A process for removing metals in a petroleum oil material, comprising the steps of: (a) mixing the petroleum oil material with a removing agent, which comprises a phosphoric acid ester; and an aqueous phase, and subjecting the reaction mixture to stirring and heating using microwaves for a first period of time, at a temperature which is lower than the boiling point of the removing agent, to enable reaction between said DMA and metals present in the petroleum oil material, thereby obtaining a reacted DMA and a treated petroleum oil; (b) adding a first mixture of solvents including water to the reaction mixture, and subjecting the aqueous reaction mixture to stirring for a second period of time, at a temperature which is less than about 95° C.; (c) allowing the aqueous reaction mixture to stand for a third period of time, thereby obtaining an oil phase comprising a treated oil and one or more phases including an aqueous phase; and (d) subjecting the aqueous reaction mixture to separation thereby yielding the treated oil.
3) A process according to (2), further comprising the steps of: (e) washing the treated oil using a second mixture of solvents including water; and (f) retrieving a washed treated oil, optionally steps (e) and (f) is repeated one time or more.
(4) A process according to (2), wherein the treated oil is further subjected to steps (b) to (d), one time or more.
(5) A process according to (2), wherein the treated oil is further subjected to steps (a) to (d), one time or more.
(6) A process according to (3), wherein a composition of the first mixture of solvents at step (b) and the second mixture of solvents at step (d) is the same or is different; optionally the first and second mixtures of solvent each independently comprises an organic solvent; optionally the organic solvent is an alcohol such as ethanol, or benzene, or hexane, or 4-methyl-2-pentanone.
(7) A process according to (3), wherein step (f) is conducted at ambient temperature.
(8) A process according to (2) or (3), wherein steps (d) and (f) each independently comprises use of a reflux system; optionally steps (d) and (f) each independently comprises decantation, centrifugation, filtration or a combination thereof.
(9) A process according to any one of (1) to (8) may be batch operated, semi-batch operated, continuous-flow operated, or combinations of thereof.
(10) A process according to any one of (2) to (9), where in microwaves may be applied at a frequency range from about 0.3 GHz and about 300 GHz, or higher, or lower.
(11) A process according to any one of (2) to (10), wherein a length of the first period of time at step (a) is sufficient for the interaction of metals with microwaves.
(12) A process according to any one of (2) to (11), wherein the aqueous phase obtained at step (c) comprises reacted removing agent, and wherein the reacted removing agent is further subjected to a regeneration treatment to yield the removing agent; optionally the regenerated removing agent is re-used at step (a); optionally the reacted removing agent comprises metal salts of the removing reacted agent.
(13) A process according to (12), wherein the regeneration treatment of the reacted removing agent comprises causing the treated reacted removing agent to react with an acid.
(14) A process according to any one of (2) to (13), wherein the one or more phases obtained at step (c) comprise at least one phase comprising unreacted removing agent in an organic solvent, and wherein the unreacted removing agent is re-used at step (a).
(15) A process according to any one of (2) to (14), wherein the aqueous phase obtained at any of the steps is re-used in the process.
(16) A process according to any one of (1) to (15), wherein an amount of the removing agent is: between about 0.1 vol. % to about 5 vol. % an amount of the petroleum oil, or between about 0.1 vol. % to about 4 vol. % an amount of the petroleum oil, or between about 0.1 vol. % to about 3 vol. % an amount of the petroleum oil, or between about 0.11 vol. % to about 2 vol. % an amount of the petroleum oil, or about 2 vol. % an amount of the petroleum oil; or about 1 vol. % an amount of the petroleum oil.
(17) A process according to any one of (1) to (15), wherein an amount of the removing agent is: between about 0.1 wt. % to about 5 wt. % an amount of the petroleum oil, or between about 0.1 wt. % to about 4 wt. % an amount of the petroleum oil, or between about 0.1 wt. % to about 3 wt. % an amount of the petroleum oil, or between about 0.1 wt. % to about 2 wt. % an amount of the petroleum oil, or about 2 wt. % an amount of the petroleum oil; or about 0.1 wt. % an amount of the petroleum oil.
(18) A process according to any one of (1) to (17), wherein other impurities in the petroleum oil are also removed.
(19) A process according to (18), wherein the metals and other impurities, as measured by Neuron Activation Analysis, comprise at least one of: Cd, U, Ca, V, Ti, Sn, Sr, Ag, Mn, Si, Al, Mg, Na, Fe, K, Zn, Cr, Cl, V, Co, Ni, Cu, As, Se, Br, Rb, Zr, Mo, In, Sn, Sb, I, Cs, Ba, La, Hf, W, Hg, Th, and Sc.
(20) A process according to (18), wherein the metals and other impurities, as measured by Neuron Activation Analysis, comprise at least one of: Ti, Mn, Al, Mg, Na, V, Ni, Cl, I, Br, Ca and S.
(21) A process according to any one of (1) to (20), wherein the metals, as measured by Neuron Activation Analysis, comprise at least one of: V and Ni.
(22) A process according to any one of (1) to (21), wherein the removing agent is a phosphoric acid ester of general formula I below

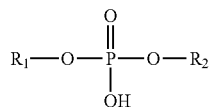

wherein $R_1$ and $R_2$ are each independently $C_1$ to $C_{20}$ a linear or branched, cyclic or non-cyclic, saturated or unsaturated alkyl group, optionally comprising a heteroatom which is O, S or N.

(23) A process according to (22), wherein $R_1$ and $R_2$ are each independently a $C_8$ to $C_{20}$ or a $C_8$ to $C_{16}$ or a $C_{16}$ a linear or branched, cyclic or non-cyclic, saturated or unsaturated alkyl group, optionally comprising a heteroatom which is O, S or N.

(24) A process according to any one of (1) to (23), wherein the metal removing agent comprises di-(2-ethylhexyl)phosphoric acid (DEHPA or HDEHP) outlined below

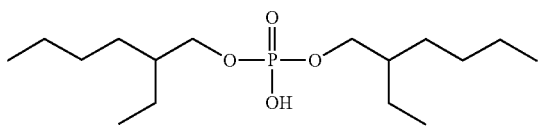

DEHPA or HDEHP

DEHPA or HDEHP

(25) A process according to (2), wherein the temperature at step (a) is between about 25° C. to about 70° C., or between about 25° C. to about 60° C., or between about 25° C. to about 50° C., or between about 25° C. to about 40° C., or about 25, or about 80° C.

(26) A process according to any one of (2) to (25), wherein the temperature is provided using electromagnetic waves at the microwave frequency.

(27) A process according to any one of (2) to (26), wherein the temperature is provided using microwave, ultrasound, induction heating, plasma or a combination thereof.

(28) A process according to any one of (1) to (27), wherein the metal removing agent is selected from the group consisting of: di-(2-ethylhexyl) phosphoric acid, bis(2-ethylhexyl) hydrophosphoric acid, di-(2-ethylhexyl) orthophosphoric acid, O,O-bis(2-ethyl hexyl) phosphoric acid, orthophosphoric acid 2-ethylhexyl alcohol, phosphoric acid di(2-ethylhexyl) ester and Hostarex PA 216™.

(29) A process according to any one of (1) to (28), wherein the removing agent is miscible to the petroleum oil.

(30) A treated oil obtained by the process as defined in any one of (1) to (29).

(31) A treated oil obtained by the process as defined in any one of (1) to (29), wherein a content of the metals in the treated oil is about 80 to 100% lower than in the petroleum oil.

(32) A treated oil obtained by the process as defined in any one of (1) to (30), wherein a content of V in the treated oil is about 95% lower than in the petroleum oil.

(32) A treated oil obtained by the process as defined in any one of (1) to (30), wherein a content of Ni in the treated oil is about 75% lower than in the petroleum oil using microwaves.

(33) A treated oil obtained by the process as defined in any one of (1) to (30), wherein: a content of V in the treated oil is about 95% lower than in the petroleum oil using microwaves.

(34) A system for treating petroleum oil, which is adapted for conducting the process as defined in any one of (1) to (33).

(35) An oil treatment facility, comprising the system as defined in (34); optionally the facility is an industrial facility Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings.

DESCRIPTION OF ILLUSTRATIVE EMBODIMENTS

Figure 1:
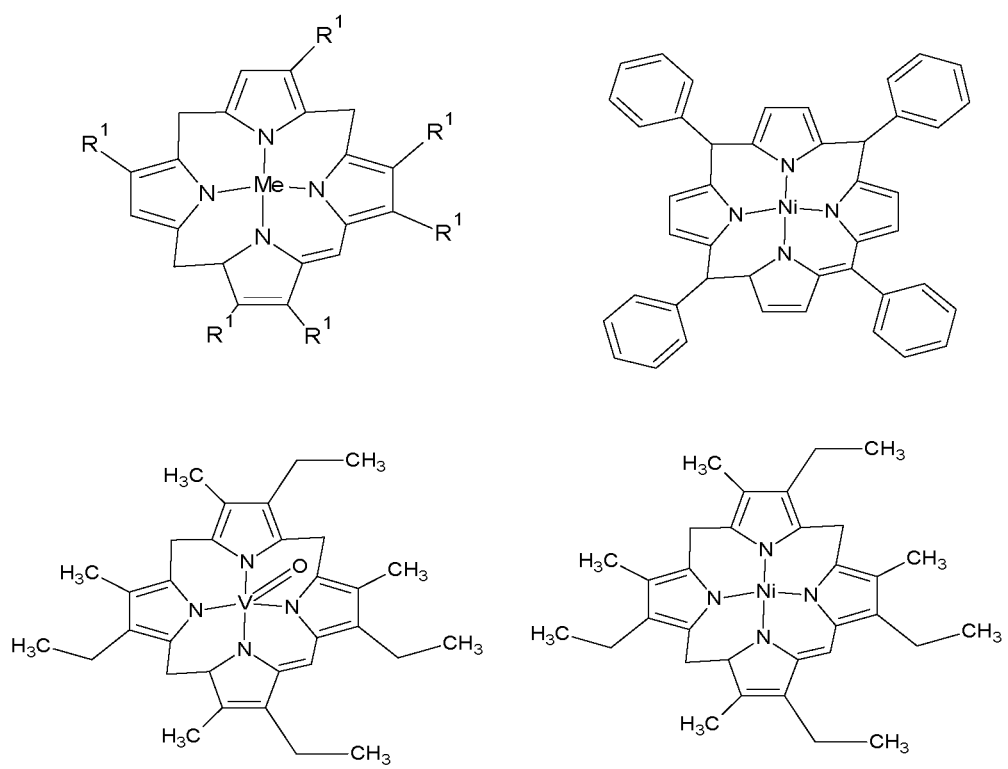
FIG. 1: Different forms of a metalloporphyrin ring.

Before the present invention is further described, it is to be understood that the invention is not limited to the particular embodiments described below, as variations of these embodiments may be made and still fall within the scope of the appended claims. It is also to be understood that the terminology employed is for the purpose of describing particular embodiments; and is not intended to be limiting. Instead, the scope of the present invention will be established by the appended claims.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

Use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein when referring to numerical values or percentages, the term "about" includes variations due to the methods used to determine the values or percentages, statistical variance and human error. Moreover, each numerical parameter in this application should at least be construed in light of the number of reported significant digits and by applying ordinary rounding techniques.

As used herein, the term "removing agent" or "demetallization agent (DMA)" refers to a suitable agent that mixes with the petroleum oil and is adapted to removing metals from the petroleum oil. Such agent is also adapted to removing other impurities in the petroleum oil. Such agent comprises a phosphoric acid ester.

As used herein, the term "microwaves" refers to electromagnetic waves at any frequency between about 0.3 GHz and about 300 GHz.

As used herein, the term "demetallization agent" refers to a suitable agent that mixes with the petroleum oil and is adapted to removing metals from the petroleum oil. Such agent is also adapted to removing other impurities in the petroleum oil. Such agent comprises a phosphoric acid ester.

The inventors have designed and conducted a process for removing metals from a petroleum oil material. The process uses a removing agent which is a demetallization (DM) agent. The demetallization agent (DMA) according to the invention comprises a phosphoric acid ester.

The present invention is illustrated in further details in the Experimental Work section below. The section includes non-limiting examples.

Experimental Work Conducted

Materials: The demetallization (DM) process according to the invention has been implemented on two different petroleum crudes, Iran and Basra oils, were obtained directly from the tanks of the TOTAL refinery station in France with a high concentration of V and Ni. Other chemical agents, such as the DMA and the solvents, were purchased from Sigma-Aldrich, Canada; di-(2-ethylhexyl)phosphoric acid (DEHPA or HDEHP) outlined below was generally used as DMA in the experiments conducted.

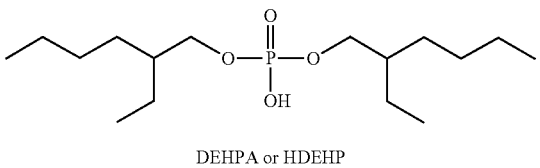 [SMILES: CCCCC(CC)COP(=O)(O)OCC(CC)CCCC]

DEHPA or HDEHP

The concentration of metals in the oil samples was determined by the neutron activation analysis technique (NAA) using the SLOWPOKE reactor at Polytechnique Montréal, QC, Canada. The Fourier-transform infrared spectroscopy (FTIR) was also applied to detect the transformation of the nitrogen-metal (N-M) bond to the nitrogen-hydrogen (N—H) bond after the treatment process. The analysis was implemented using a Perkin Elmer 65 FTIR-ATR instrument (PerkinElmer, Woodbridge, ON, Canada).

The other required information archived directly from the supplier, Iran and Basra oils, are presented in Table 1 below.

TABLE 1

| Characteristic of the processed oils | | | |
|---|---|---|---|
| Property | Unit | Basra Oil | Iran Heavy |
| Density (15° C.) | kg/m$^3$ | 886.8 | 881.2 |
| API | — | 27.98 | 28.99 |
| Viscosity (10° C.) | mm$^2$/s | 23.8 | 18.4 |
| Viscosity (37, 8° C.) | mm$^2$/s | 9.32 | 10.6 |
| Viscosity (50° C.) | mm$^2$/s | 6.79 | 8.67 |
| Ni | mg/kg | 12 | 25 |
| V | mg/kg | 40 | 85 |
| CCR | % W | 7.845 | 6.88 |

Figure 2:
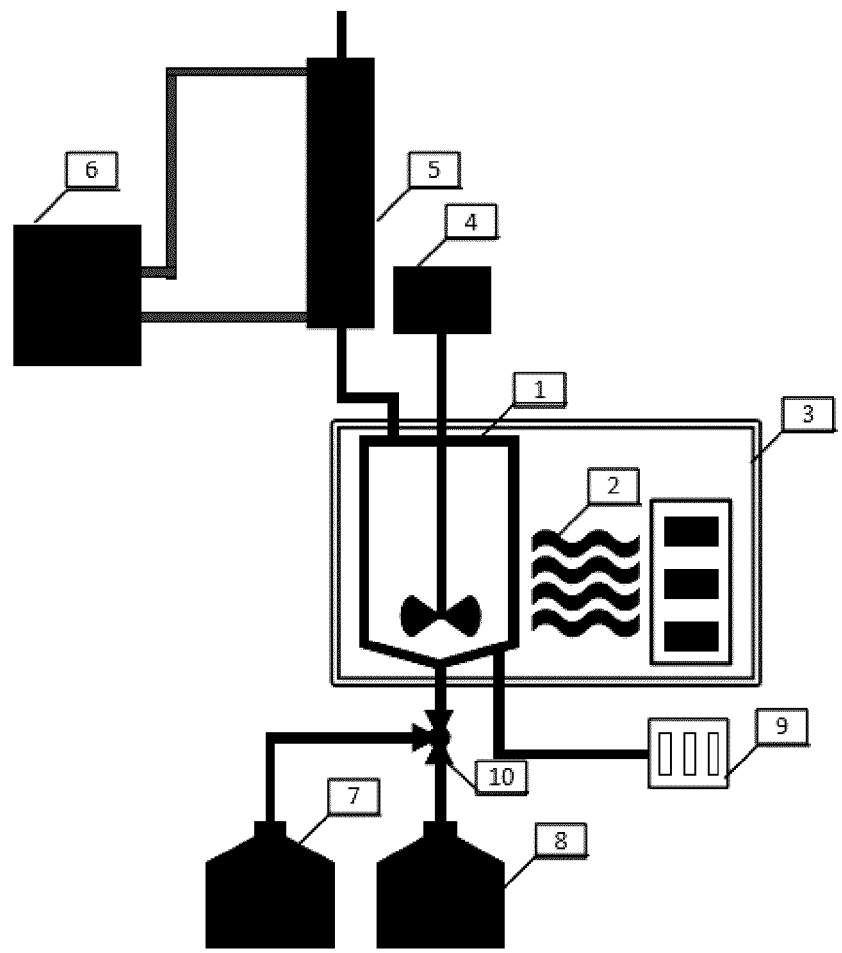
FIG. 2: Experimental setup of the process according to the invention.

Experimental setup: The experimental setup shown in FIG. 2 was employed to carry out the experimental work. The reference numerals in FIG. 2 are as follows: reactor (1), microwave generator (2), microwaves (3), agitator (4), heat reflux (5), water cooler (6), treated oil tank (7), washing liquids tank (8), thermometer (9) and three-ways valve (10).

The mixture of the petroleum oil and the reactants is poured into the batch reactor equipped with a stirring technique. The reactor is attached to a water-cooled condenser fitted onto the top. The condensation system, in other words, reflux, works at a temperature of about −5° C. and ambient pressure. The central role of the reflux is to condense the lower molecular weight compounds that might be vaporized during the reaction time due to increasing temperature. The reactor is heated using microwaves to a temperature lower than the boiling point of the DMA yet enough to perform the removal reaction. The temperature was controlled based on the direct measurement by using a thermometer does not interact with microwaves.

Figure 3:
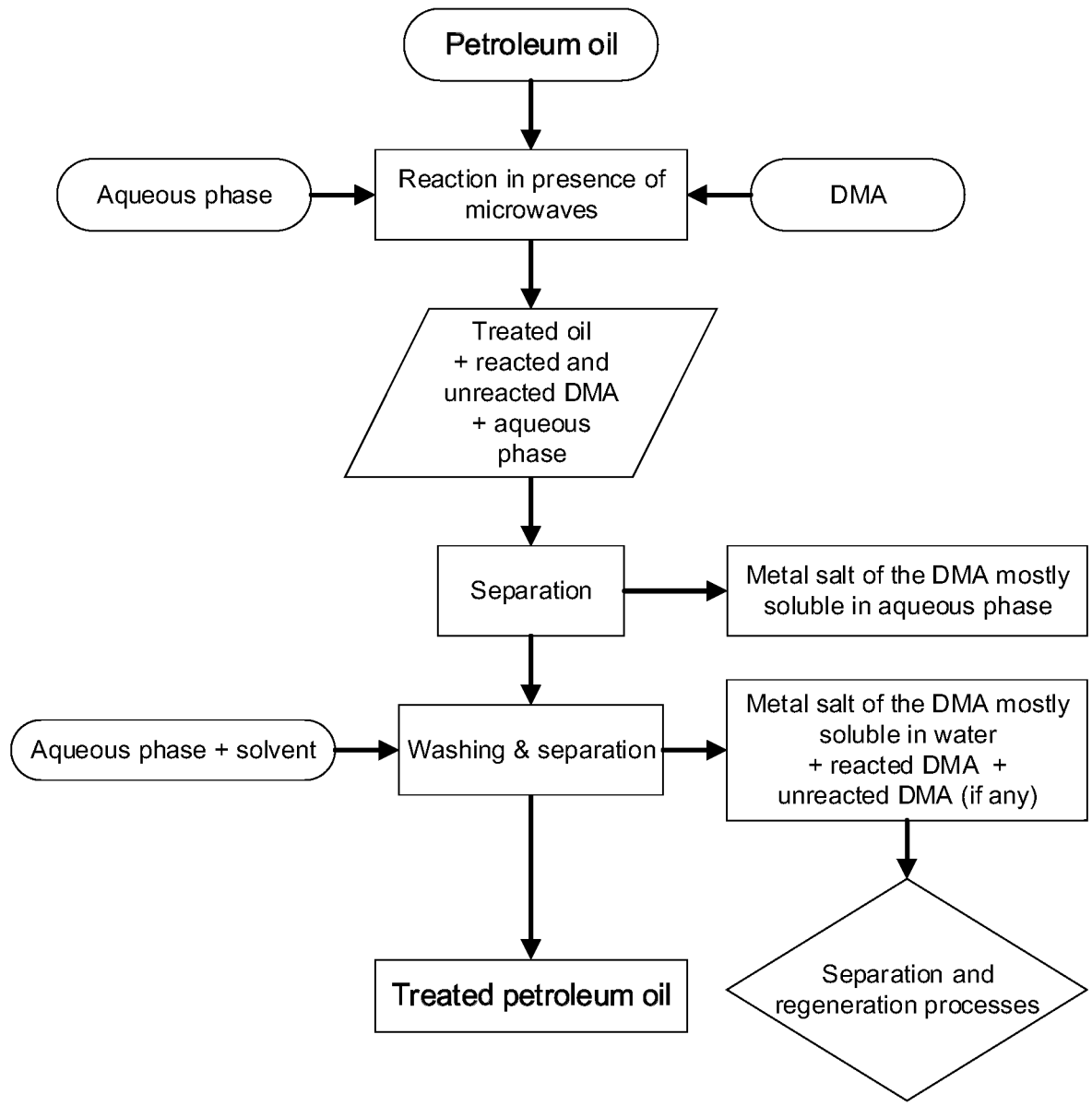
FIG. 3: Flowchart of the process according to the invention.

Experiment procedures: A flowchart illustrating the process according to the invention is presented in FIG. 3, also showing the regenerations of various components of the process. The process comprises three primary stages. The initial stage is the reaction between the DMA and the oil in the presence of an aqueous phase. The primary task of the employed aqueous phase is to trap the metal salt of DMA as soon as it forms during the extraction process. The reaction was performed under different microwave powers and irradiation times to better understand the effect of these parameters on the elimination performance. The second stage is the separation of the aqueous phase after the reaction and third stages involved washing the treated oil and then separating the extracted metals from the washing mixture.

treatment of the petroleum oil with the DMA (reaction); separation of the treated oil from the reacted and/or unreacted DMA (in aqueous phase); and washing the treated oil. More details on each of the steps of the process are outlined herein below.

Treatment of petroleum oil with the DMA in the presence of microwaves (reaction): A weight/volume amount of the petroleum oil was mixed with the DMA. An amount of DMA between about 0.1 wt. % and 5 wt. % of the amount of the petroleum oil was generally used. The mixture of petroleum oil and DMA was poured into the reactor as outlined in FIG. 2. It is worth mentioning that the described process does not need an emulsification process, which is contrary to most of the existing chemical metals removal techniques. The principal reason for this aspect is the good miscibility of the DMA according to the invention with petroleum oil. Stirring is applied during the reaction for mixing the reactants and for properly distributing the microwave-to-heat conversion inside the reactor. This enhances the replacement reaction taking place between the treated oil and the DMA. The mixture is heated up to about 70° C. at ambient pressure.

Separation: Efforts were made to carefully separate the treated oil from the reacted DMA (containing the metal salt of DMA) and any unreacted DMA. The challenge is due to the fact that all the components involved, namely, the treated oil, reacted DMA and any unreacted DMA, are all present in the same vessel. The separation process was performed using a mixture of solvents comprising organic solvents and water. In embodiments of the invention, an organic solvent such as an alcohol was used together with water. A first solvent was used mainly to dissolve any unreacted DMA and separate it from the treated oil. A second solvent, preferably in aqueous phase, was used to dilute the salts of DMA and other purposes. In embodiments of the invention ethanol and water were used. The mixture of the first and second solvents and the treated oil was then subjected to heating at a temperature of less than about 95° C. under stirring conditions and in the presence of microwaves for a few minutes. The separation is generally performed in a reflux system to avoid the evaporation of the solvent which would allow for the precipitation of the dissolved compounds back into the oil. After the separation time, a mixture of three phases could be observed in the reactor. The upper phase comprising the treated oil, the lower phase comprising both the reacted DMA dissolved in the aqueous phase and unreacted DMA dissolved in the used alcohol. Eventually, the two obtained phases were separated by decantation, or any other method, and, then, centrifugation.

Washing the treated oil: After the separation, the collected oil phase was subjected to washing in order to ensure a complete removal of the reacted DMA and any unreacted DMA. More than one washing was performed, generally about three washings were performed. In embodiments of the invention, the first and second solvents used in the separation step were also used in the washings. Washing was performed at room temperature with stirring or shaking for few minutes. The mixture was then poured into a separation system where it was left to stand until complete detachment of the two phases. A centrifugal separation system was eventually used for the aqueous phase/oil phase separation; then the treated oil was sent for the analytical techniques.

FTIR technique: Fourier transform infrared spectroscopy analysis was undertaken using a Perkin Elmer 65 FTIR-ATR instrument (PerkinElmer, Woodbridge, ON, Canada). A sum of 128 scans was accumulated for the signal averaging of each IR spectral measurement with a 4 cm-1 resolution. The spectra of the samples were recorded over a wavenumber range of 4000-650 cm-1 to detect the transformation of N-M bond to the N—H bond. FTIR can detect the characteristic vibration frequencies for each bond, functional group, side chain, and cross-link inside the molecule. The demetallization reaction is primarily founded on the conversion of N-M bonds into the N—H bond. The FTIR technique is a good candidate to observe the changes taking place in the N-M bond. Unfortunately, the FTIR instrument used in the detection process could not detect peaks lower than 600 cm-1; consequently, the peaks of N-M bonds at less than 400 cm-1 have not been recorded.

Neutron activation analysis: Neutron activation analysis is a nuclear technique used to determine the compactness of each element existing in vast numbers of chemical compounds. The analysis was performed in a slowpoke lab at Polytechnique Montreal, QC, Canada. In this technique, a neutron source is required for bombarding the sample with neutrons. Due to this bombardment, the element transfers to its isotopic form. According to the radioactive emission and decay data known for each element, the spectra of emission of gamma rays for all the elements can be easily studied. Quantifying various metals in petroleum oil is indeed a challenge, due to the complex matrix of petroleum oil, which includes vast numbers of metals and different elements. In addition, the depressed concentration of each metal remains a considerable issue to be determined by most of the analytical techniques. Many of the metals and elements are interfering as well, which affects the accuracy of the measurements. The NAA technique is characterized by high accuracy in quantifying a wide assortment of metal elements in the complex matrix of petroleum oil. Its proficiency is indirectly dealing with the oil itself without any digestion process or dilution, such as the ICP-MS technique, which has several factors for error production in the measurements. The drawbacks, the uncertainty, and the limitations were determined for the NAA measurements to heighten the accuracy of the technique. An optimum method that can be used for metals quantification using the NAA technique is the k0-Neutron Activation analysis (k0-NAA). This method is a single-comparator standardized method used for high accuracy quantification of elements in any type of materials. By applying this method, the calibration of each element by changing the matrix or the detector is not required.

Results and discussion: The DMA applied in this work exhibits the same behaviors as carboxylic acids in terms of the reception of microwave energy. When a mixture of oil and DMA is exposed to the microwaves, the interaction of the mixture with the microwaves is improved compared to the oil alone. According to the microwave heating mechanism, polar compounds can effectively absorb microwave energy. On the other hand, nonpolar materials are not adequately able to convert the energy of the electromagnetic waves into heat. Thus, the interaction of petroleum oil with microwaves is almost negligible compared to that of the aqueous phase and the employed DMA. This aspect affirms that the inclusion of the DMA with oil enhances the interaction with microwave heating by creating hot spots in some specific sites. The novelty of employing electromagnetic waves in such reactions is to focus the interaction with microwaves where the metals exist and, as a result, enhance the heat generation at the N-M bonds. This approach facilitates the dissociation or, in other words, breakdown of the metal bond, which reinforces the liberation of the metal from the core of the metalloporphyrin ring. The employed DMA can then easily extract the metals from the surrounding porphyrin ring and provide the ring with the required protons that are essential for complete stability.

Figure 4:
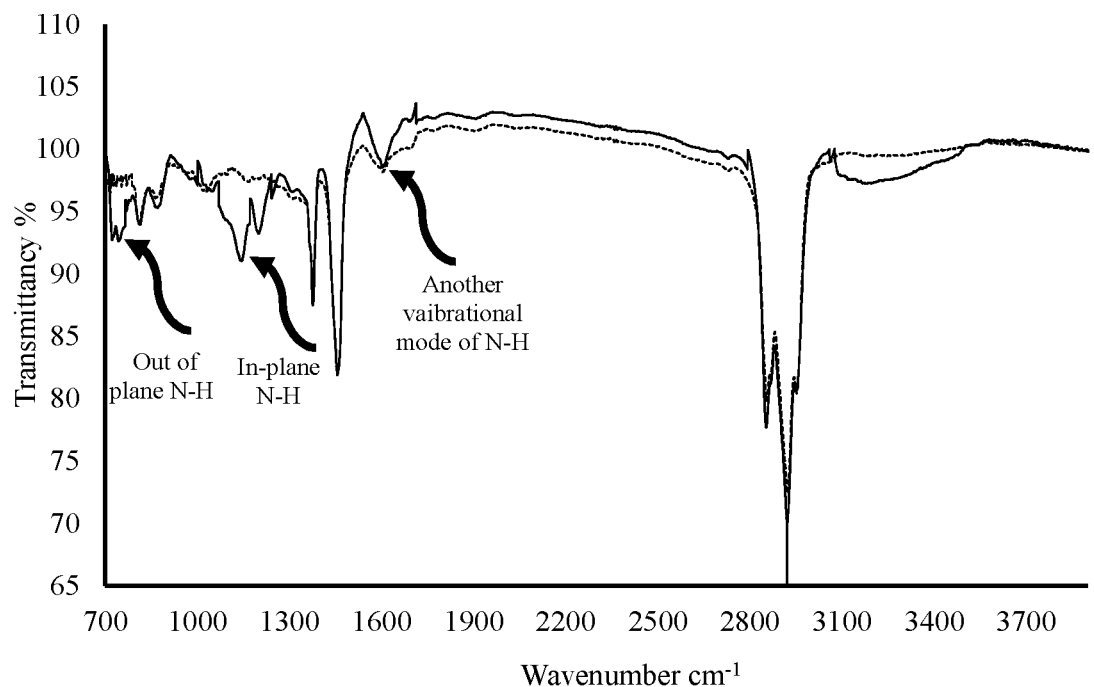
FIG. 4: FTIR of raw (dotted line) and microwave treated Iran oil (continuous line)

FIG. 4 shows the deviation in the IR absorption frequencies between the untreated and treated Iran oil with microwave. There is a weak band at 3430 cm$^{-1}$, which is attributed to the N—H bond stretching frequency [11-14]. There is also a peak located around 1600 cm$^{-1}$ that is assigned to another vibrational mode of N—H [15]. The peaks appeared at around 1110 cm$^{-1}$ and 740 cm$^{-1}$ in the treated oil relative to in-plane N—H and out-of-plane bending N—H, respectively [16].

The bands around 2922 cm$^{-1}$ referred to the C—H bond of the benzene ring and pyrrole ring. Bands at around 1458 cm$^{-1}$ and at around 1379 cm$^{-1}$ are attributed to the C═C stretching mode and the C═N stretching vibration, respectively. The bands at around 800 cm$^{-1}$ and 750 cm$^{-1}$ were respectively appointed to the C—H bond bending vibration of para-substituted and ortho-substituted phenyl rings.

Figure 5:
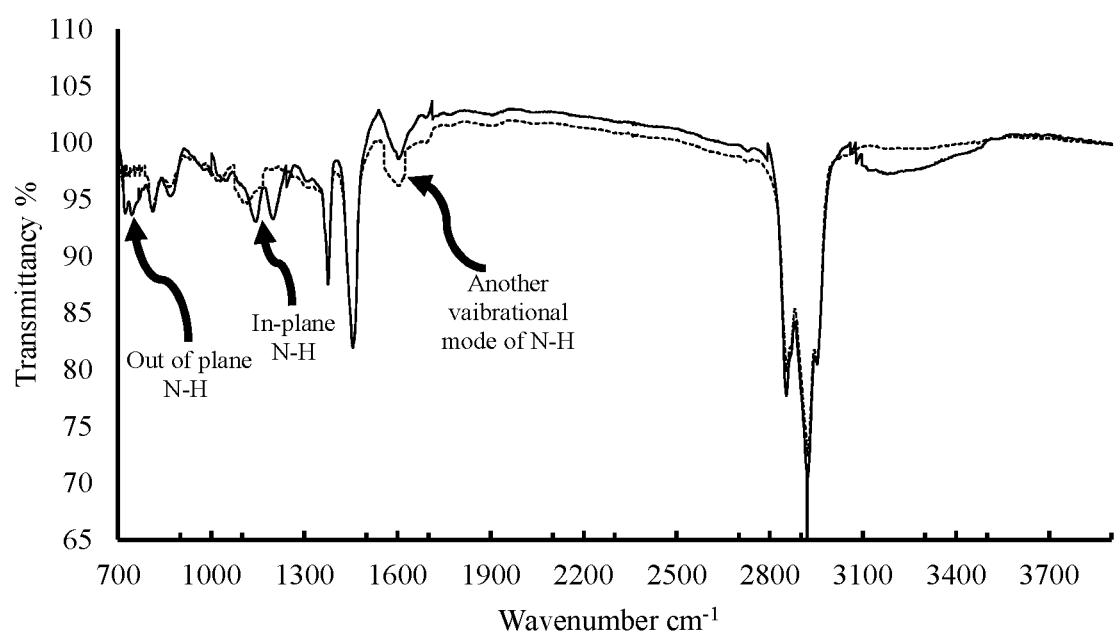
FIG. 5: FTIR of raw (dotted line) and microwave treated Basra oil (continuous line).

FIG. 5 shows the same peaks appearing in FIG. 4 but for Basra oil. The FTIR results confirm that new peaks appeared in the treated oil which related to the N—H bond. This finding, in turn, confirms that the treatment process using the DMA according to the invention was successfully implemented and the N-M bond transferred to N—H bond.

To accurately determine the metal content in the oils, the NAA technique was performed. The analysis was carried out on the petroleum oil, the treated oil and the aqueous phase produced after the washings. A difference in the metal content between the petroleum oil and the treated oil was detected. In addition, the analysis of the aqueous phase showed the presence of metals in the aqueous phase after the washing step. It is worth mentioning that almost all the metals concentrations have been reduced compared to the petroleum oil, specifically, V and Ni, which are known in the art to be difficult to eliminate.

Figure 6:
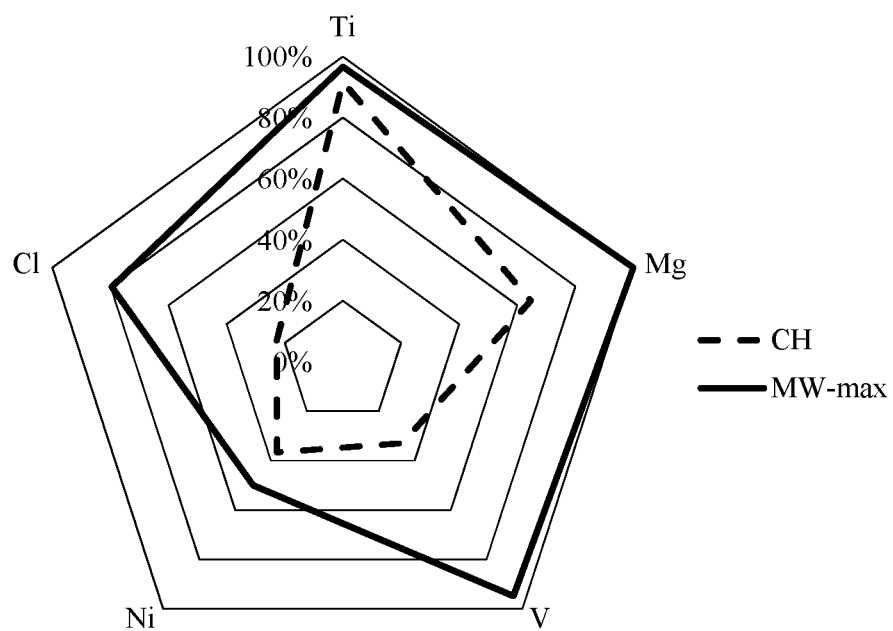
FIG. 6: Removal efficiency of treated Iran oil using conventional (dotted line) and microwave heating (continuous line)

FIG. 6 illustrates the removal efficiency comparison of both heating mechanisms in the case of Iran oil. The figure reveals a significant variation in approximately all the metals compared to that of conventional heating.

Figure 7:
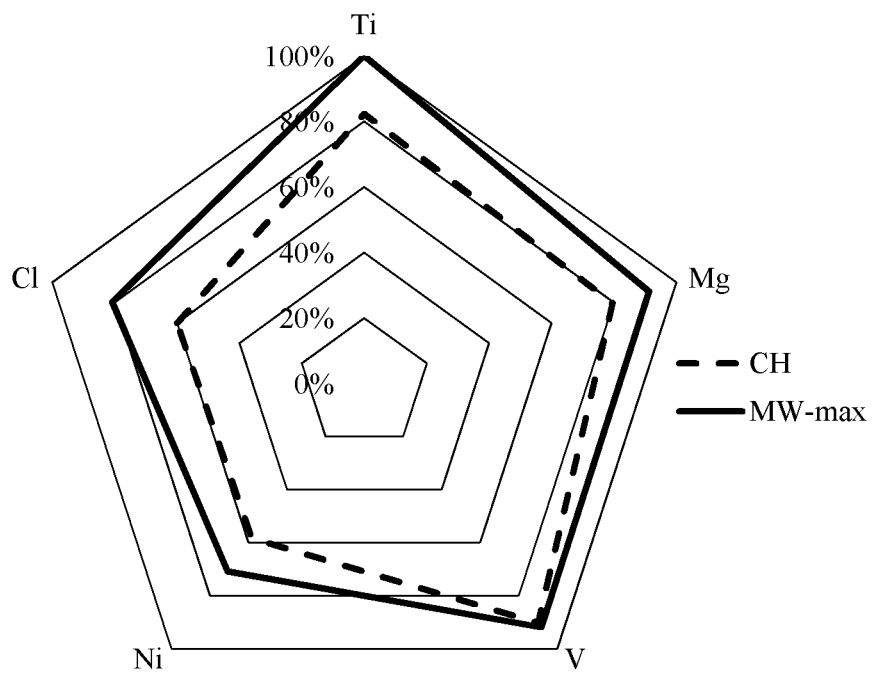
FIG. 7: Removal efficiency of treated Basra oil using conventional (dotted line) and microwave heating (continuous line)

It is evident from FIG. 6 and FIG. 7 that the concentration of Ti not considerably dropped using conventional heating only and the removal efficiency reached 92%. The concentration of V and Ni presented in FIG. 6, FIG. 8, and FIG. 9 decreased with small amounts and the removal performance reached around 35% in the case of conventional heating.

Although Ti, Ni, and V remain in the oil in the same chemical forms, the elimination efficiency using traditional heat is quite apparent in the results of Ti. The principal reason behind this attitude is linked to the deviation in the electronegativity difference between the N atoms and each metal in the metalloporphyrin ring. The electronegativity difference between N and Ti is more significant than that of V and Ni. Thus the N—Ti bond has more ionic character than that of V and Ni. Accordingly, N can withdraw the bond electrons easily, forming a negatively-charged N and positively-charged Ti, which dramatically boost the liberation of Ti from the porphyrin ring and enhance the removal efficiency of Ni and V. When using microwave heating, removal efficiency increased because microwaves generated hotspots near or entirely within the area where the reaction took place thanks to the interaction of the matter with microwaves. For this reason, the removal capability of both V and Ni is higher than that of Ti when using microwave heating compared to the reference case.

FIG. 6 also demonstrates that both Mg and Cl have high removal efficiencies, 100%, and 80%, respectively, when applying microwave heating compared to 65% and 23% when using conventional heating due to the elements remaining in the oil as inorganic salts, mainly in the form of chloride or sulfate of Mg and other metals ions, such as Ca. These salts are highly soluble in water because they are characterized by high polarity and, in turn, significant interaction with microwaves.

The better results of Mg compared to Cl are mainly due to the greater interaction of Mg with microwaves compared to that of Cl. Moreover, Mg is present in petroleum oil in another form, the metalloporphyrin structure. The liberation of Mg from the ring is enhanced by applying microwave heating.

Basra oil was also processed to confirm the previous explanation for each metal as it is evident in FIG. 7. All the elements in Basra oil agree with those of Iran oil except V, which has almost the same removal efficiency for conventional and microwave heating possibly due to Basra oil being less complex than Iran oil. The removal of V in the case of conventional heating is therefore easier. However, other aspects, such as the lower bulk temperature of the payload and lower energy consumption, should be considered in the comparison.

The DMA according to the invention acts as a proton donor and, thus, provides the porphyrin ring with the needed hydrogen ions to occupy the vacancies created during the metal extraction reactions. The DMA also helps to extract the metals from the porphyrin ring forming the metal salt of the agent. Behind the demetallization processes, there are a set of complex chemical reactions taking place.

The main idea behind the demetallization reaction is the ion exchange mechanism that happens very quickly in homogeneous solutions. In the reaction (cation exchanger), the agent acts as a proton donor for the metalloporphyrin ring after the four nitrogen atoms extract the electron bonds between the metals, due to the high electronegativity of the nitrogen atoms, which reaches up to 3.04 compared to 1.63 for the V atom. The high electronegativity of the four nitrogen atoms plays an essential role in leaving the metal atom as a positive metal ion after the electron bond extraction. This, in turn, forms four negative nitrogen ions, which directly bond with the hydrogen protons from the agent forming the pure porphyrin ring. At the same time, the negative side of the agent robustly extracts the positive metal ion from the media creating the metal salt of the agent.

It was essential to examine the influences of the other process parameters that could impact the elimination performance of metals. There is significant interest in such an investigation to determine the most efficient value of the parameters, among the ones applied, to maximize removal efficiency. This step was implemented using different nominal microwave powers: P5:500 W, P7: 700 W, and P10: 1000 W, and various residence times: $t_1$: 1 min, $t_2$: 2 min, and $t_3$:3 min.

Figure 12:
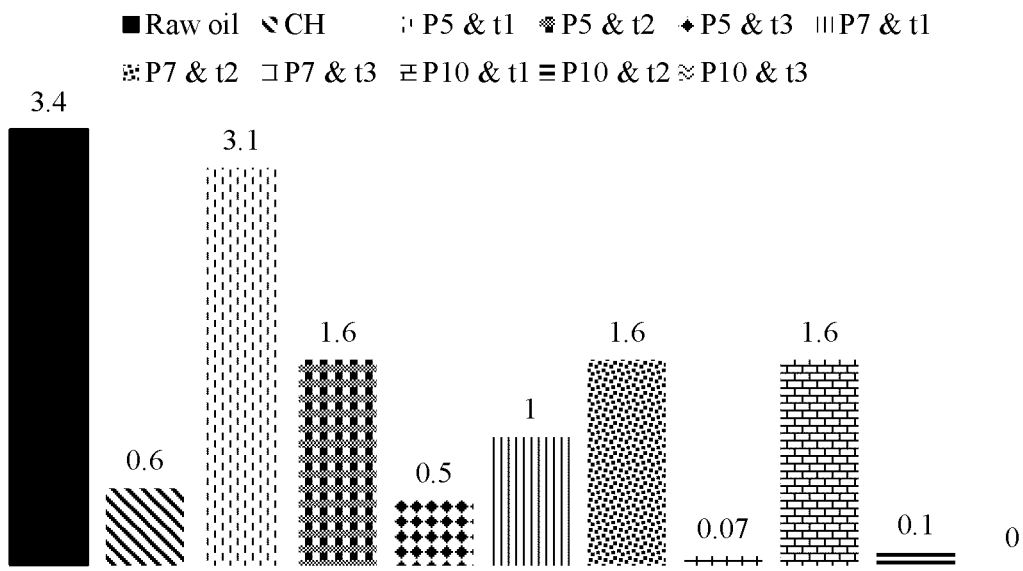
FIG. 12: Concentrations of Ti in raw and treated Basra oil using conventional and microwave heating at different powers and residence times (ppm)—P is the microwave nominal setting power. P5≈500 W; P7≈700 W; P10≈1000 W; t1=1 min; t2=2 min; and t3=3 min

It was found from the obtained NAA results of the treated Iran and Basra oils that the elimination capability of almost all the metals improved by raising the microwave power. For instance, at the time of $t_3$ FIG. 8 and FIG. 12 exhibit a decrease in the Ti concentration. It decreased from 0.8 ppm at P5 to 0.5 ppm at P10 in the case of Iran oil and from 0.5 ppm at P5 to 0.07 ppm at P7, and then 0 ppm at P10 for Basra oil.

Figure 8:
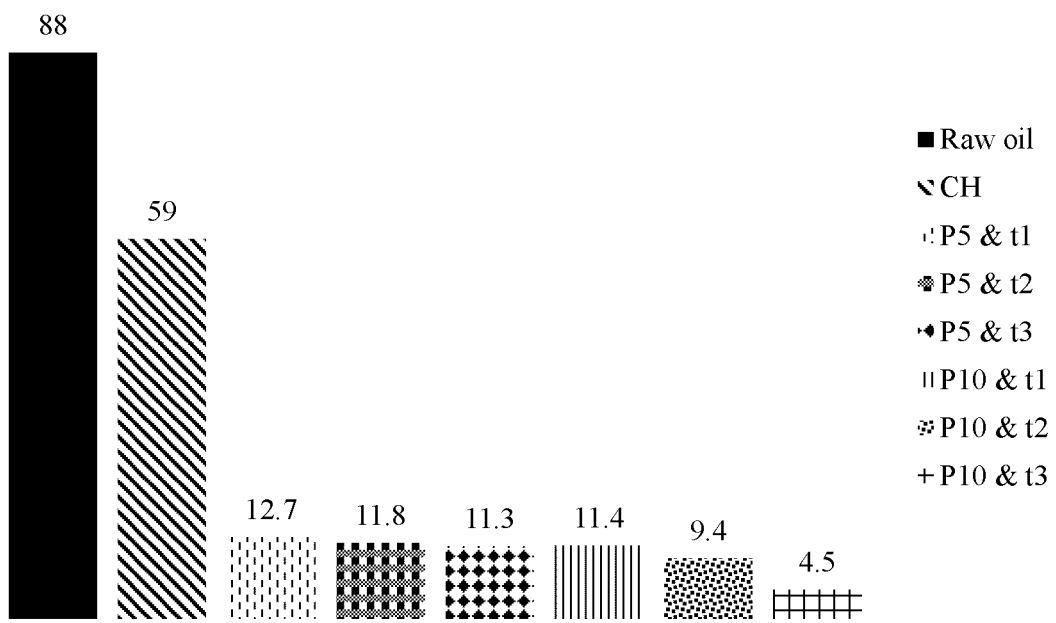
FIG. 8: Concentrations of V in raw and treated Iran oil using conventional heating (CH) and microwave heating. P5≈500 W; P7≈700 W; P10≈1000 W; t1=1 min; t2=2 min; and t3=3 min
Figure 9:
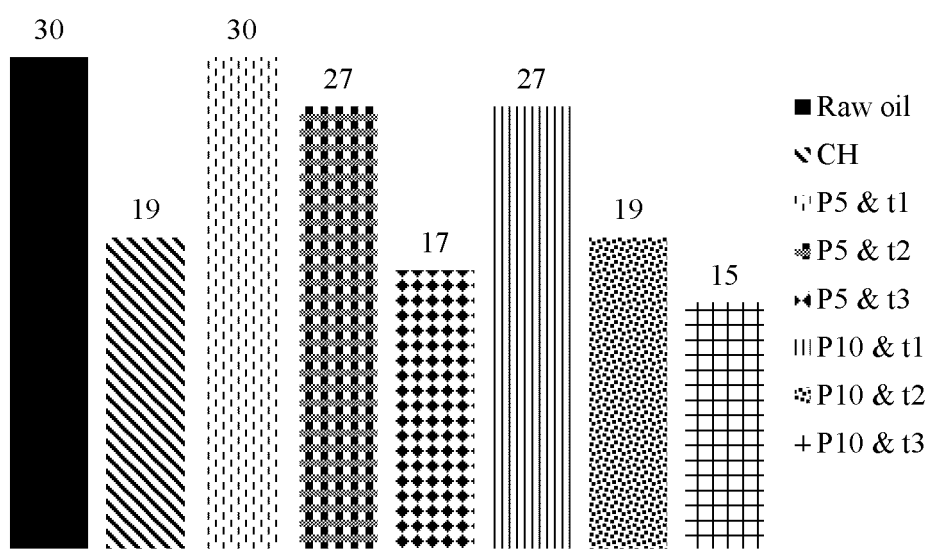
FIG. 9: Concentrations of Ni in raw and treated Iran oil using conventional and microwave heating. P5≈500 W; P7≈700 W; P10≈1000 W; t1=1 min; t2=2 min; and t3=3 min
Figure 10:
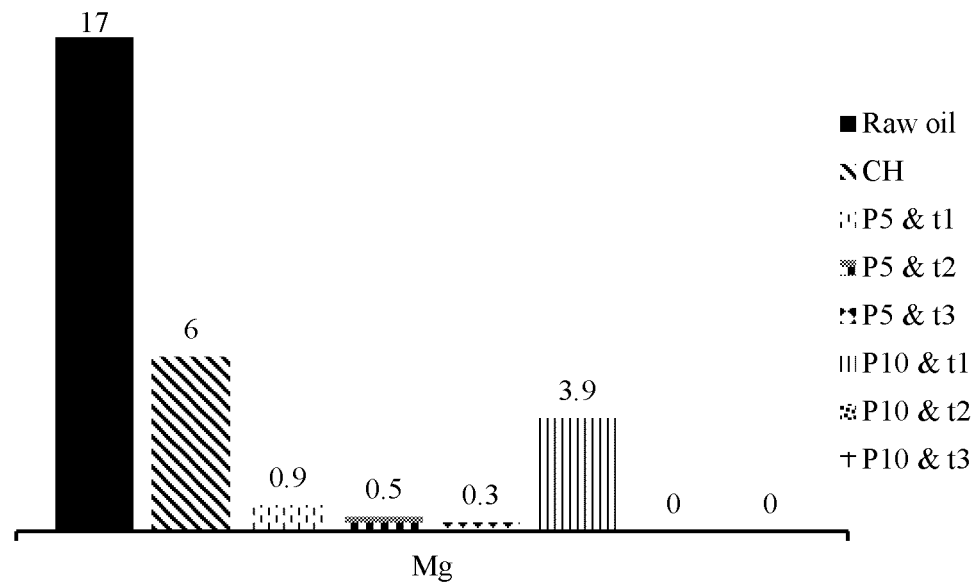
FIG. 10: Concentrations of Mg in raw and treated Iran oil using conventional and microwave heating. P5≈500 W; P7≈700 W; P10≈1000 W; t1=1 min; t2=2 min; and t3=3 min
Figure 11:
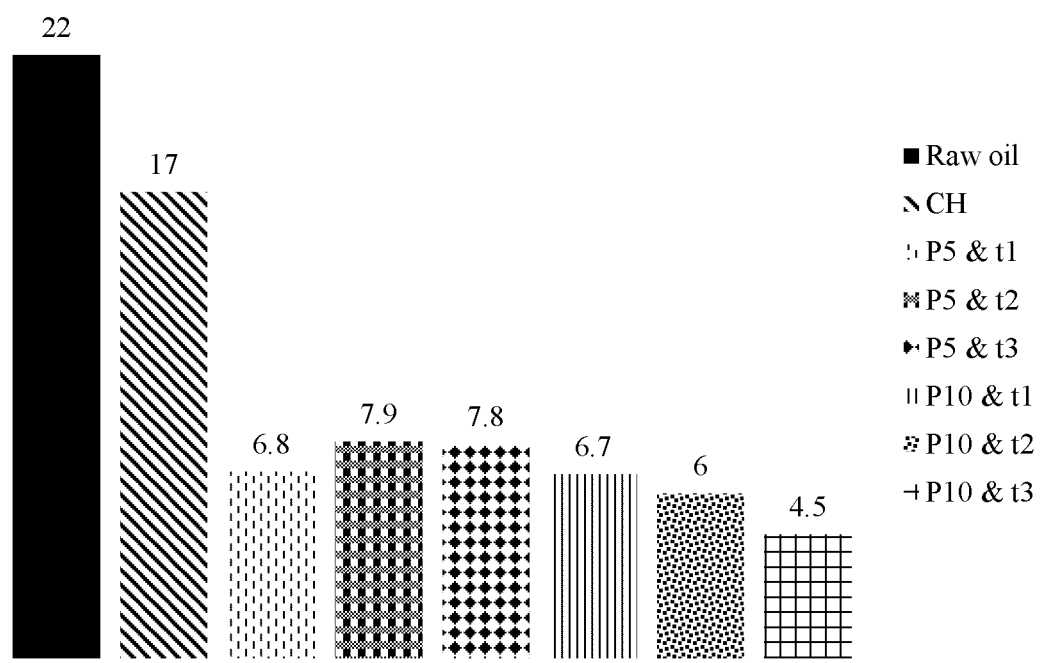
FIG. 11: Concentrations of Cl in raw and treated Iran oil using conventional and microwave heating. P5≈500 W; P7≈700 W; P10≈1000 W; t1=1 min; t2=2 min; and t3=3 min
Figure 13:
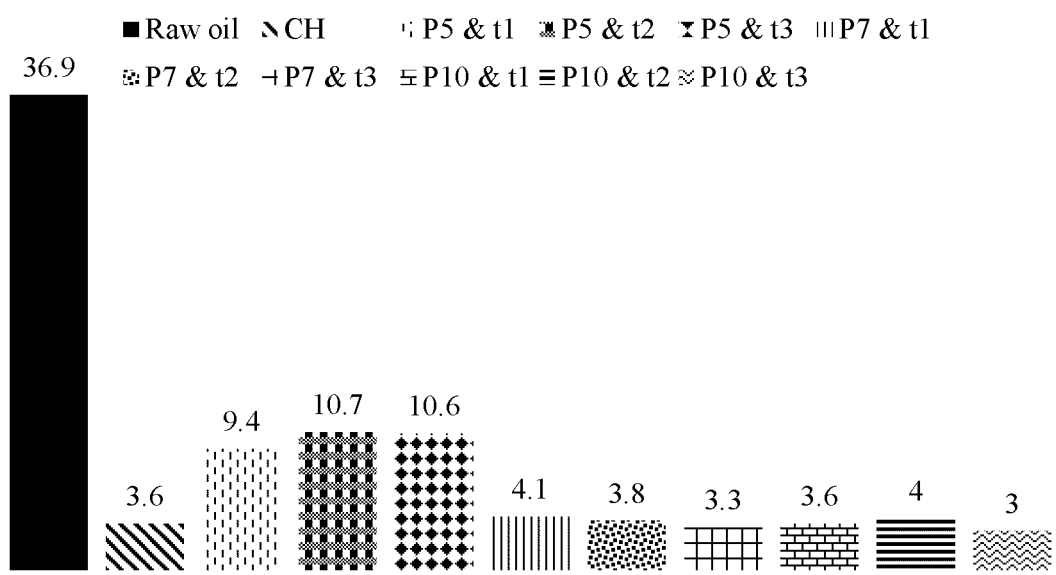
FIG. 13: Concentrations of V in raw and treated Basra oil using conventional and microwave heating at different powers and residence times (ppm)
Figure 14:
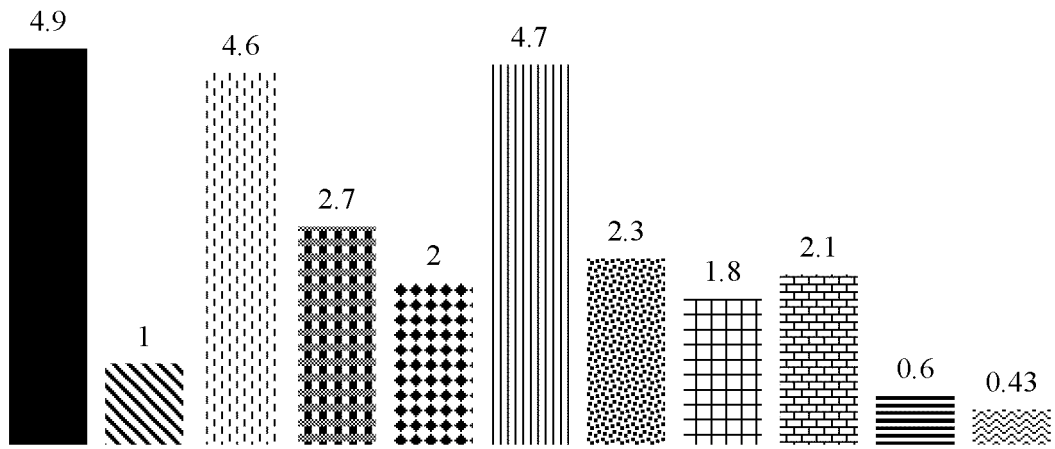
FIG. 14: Concentrations of Mg in raw and treated Basra oil using conventional and microwave heating at different powers and residence times (ppm)
Figure 15:
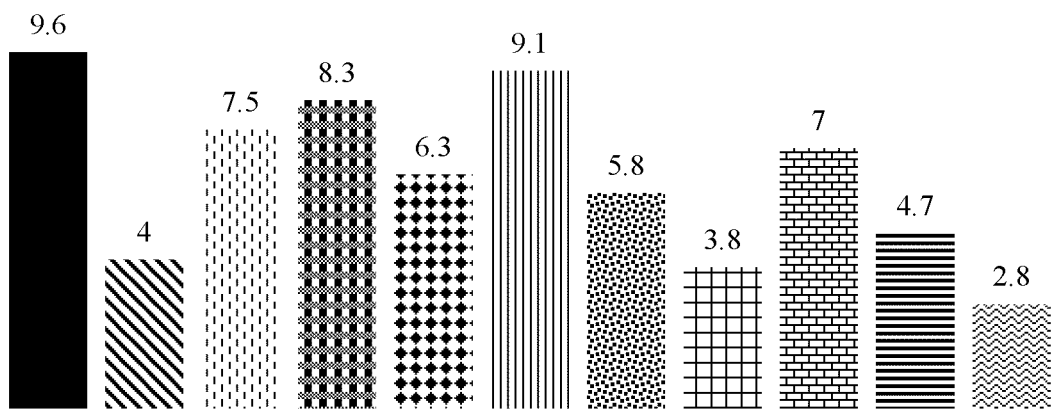
FIG. 15: Concentrations of Ni in raw and treated Basra oil using conventional and microwave heating at different powers and residence times (ppm)
Figure 16:
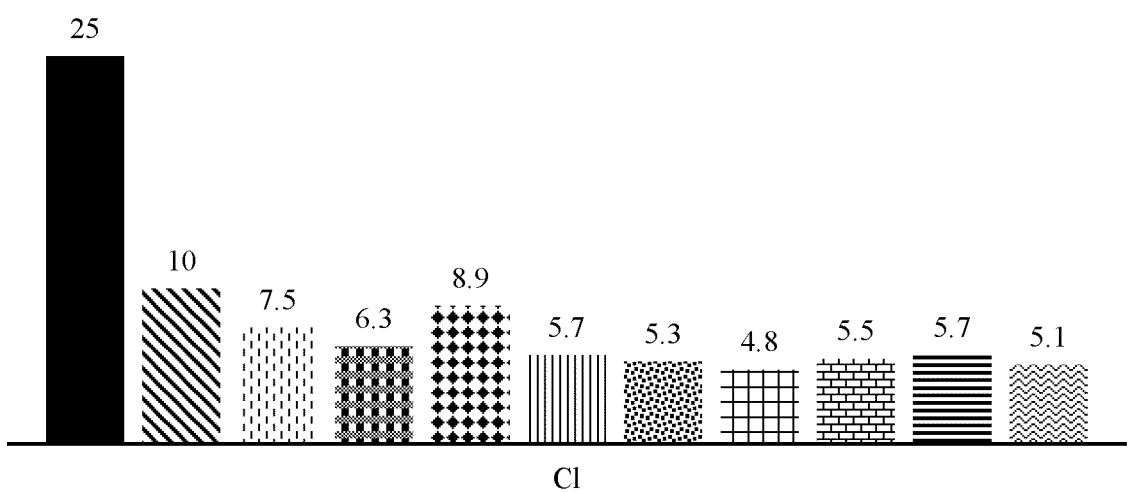
FIG. 16: Concentrations of Cl in raw and treated Basra oil using conventional and microwave heating at different powers and residence times (ppm)

The concentration of V was recorded in FIG. 8 for Iran oil and FIG. 13 for Basra oil. It decreased from 11.3 ppm at P5 to 4.5 ppm at P10 in the Iran oil. For Basra oil, the concentration of V decreased from 10.6 ppm at P5 to 3.3 ppm at P7; then the concentration showed a further decline to 3 ppm from increasing the P10. The other elements exist in FIG. 9, FIG. 10, and FIG. 11 for Iran oil and FIG. 12 and FIG. 13 for Basra oil show the same gradual drop in metals concentration. FIG. 14, FIG. 15, and FIG. 16 are in agreement with the explanation above.

The process according to the invention allows for the removal of metals and other impurities in a petroleum material. The removing agent or DMA used in the process is a phosphoric acid ester such as di-(2-ethylhexyl)phosphoric acid (DEHPA or HDEHP) outlined above. As will be understood by a skilled person, the DMA may be any suitable phosphoric acid ester, for example of general formula I below. In embodiments of the invention, the DMA is miscible with the petroleum oil.

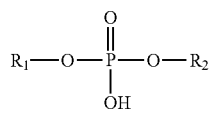

I wherein $R_1$ and $R_2$ are each independently $C_1$ to $C_{20}$ a linear or branched, cyclic or non-cyclic, saturated or unsaturated alkyl group, optionally comprising a heteroatom which is O, S or N; optionally $R_1$ and $R_2$ are each independently a $C_8$ to $C_{20}$ or a $C_8$ to $C_{16}$ or a $C_{16}$ linear or branched, cyclic or non-cyclic, saturated or unsaturated alkyl group, optionally comprising a heteroatom which is O, S or N.

The process according to the invention comprises: at least one reaction step, at least one separation step, and at least one washing step. As will be understood by a skilled person these steps may involved other steps such as decantation, centrifugation, filtration.

The process according to the invention allows for the regeneration of the DMA from the reacted DMA. This is performed by causing the reacted DMA to react with an acid such as HCl. The regenerated DMA is re-used in the process. Also, any unreacted DMA is recovered and re-used in the process. Moreover, the aqueous phases stemming from the separations are recovered and re-used in the process.

The process according to the invention embodies a system and may be readily scaled up and integrated in an industrial facility. As will be understood by a skilled person, such system and facility are within the scope of the present invention.

The scope of the claims should not be limited by the preferred embodiments set forth in the examples; but should be given the broadest interpretation consistent with the description as a whole.

The present description refers to a number of documents, the content of which is herein incorporated by reference in their entirety.

REFERENCES

1. Hayes, B. L., *Microwave synthesis: chemistry at the speed of light*. 2002: Cem Corporation.
2. Kappe, C. O., *Controlled microwave heating in modern organic synthesis*. Angewandte Chemie International Edition, 2004. 43(46): p. 6250-6284.
3. Kappe, C. O., A. Stadler, and D. Dallinger, *Microwaves in organic and medicinal chemistry*. 2012: John Wiley & Sons.
4. Jiaxi, X., *Microwave irradiation and selectivities in organic reactions*. PROGRESS IN CHEMISTRY-BEIJING-, 2007. 19(5): p. 700.
5. Dudley, G. B., R. Richert, and A. Stiegman, *On the existence of and mechanism for microwave-specific reaction rate enhancement*. Chemical science, 2015. 6(4): p. 2144-2152.
6. Chen, P.-K., et al., *Parameters affecting the microwave-specific acceleration of a chemical reaction*. The Journal of organic chemistry, 2014. 79(16): p. 7425-7436.
7. Rosana, M. R., et al., *Microwave-specific acceleration of a Friedel-Crafts reaction: Evidence for selective heating in homogeneous solution*. The Journal of organic chemistry, 2014. 79(16): p. 7437-7450.
8. De Chamorro, M. D. L. M. and M. C. Romano, *Simultaneous demetallization and desulphuration of carbonaceous materials via microwaves*. 2000, Google Patents.
9. Wang, S., J. Yang, and X. Xu, *Effect of the cationic starch on removal of Ni and V from petroleum oils under microwave irradiation*. Fuel, 2011. 90: p. 987-991.
10. Shang, H., et al., *Microwave-assisted nickel and vanadium removal from petroleum oil*. Fuel Processing Technology, 2016. 142: p. 250-257.
11. Beach, L. and J. Shewmaker, *The Nature of Vanadium in Petroleum. Extraction and Volatility Studies*. Industrial & Engineering Chemistry, 1957. 49(7): p. 1157-1164.
12. Mandal, P. C., M. Sasaki, and M. Goto, *Non-catalytic vanadium removal from vanadyl etioporphyrin (VO-EP) using a mixed solvent of supercritical water and toluene: A kinetic study*. Fuel, 2012. 92(1): p. 288-294.
13. Sombral, L., et al. *Study on nickel and vanadium removal in thermal conversion of oil sludge and oil shale sludge*. in *Journal de Physique IV (Proceedings)*. 2003. EDP sciences.
14. Awokoya, K. N., et al., *Molecularly imprinted electrospun nanofibers for adsorption of nickel-5, 10, 15, 20-tetraphenylporphine (NTPP) in organic media*. Journal of Polymer Research, 2013. 20(6): p. 1-9.
15. Y. Yamada, S. M., H. Kakiyama, H. Honda, A.t.A.o.I.S. and Technology, Editors. 1979: Japan.
16. Sen, P., et al., *Fluorescence and FTIR Spectra Analysis of Trans-A (2) B (2)-Substituted Di-and Tetra-Phenyl Porphyrins*. Materials, 2010. 3(8): p. 4446-4475.

The invention claimed is:

1. A process for removing metals in a petroleum oil material, comprising the steps of:
   (a) mixing the petroleum oil material with a removing agent which comprises a phosphoric acid ester and an aqueous solution, thereby obtaining a reaction mixture which is subjected to stirring for a first period of time, and heating at a temperature which is lower than the boiling point of the removing agent using microwaves;
   (b) adding a first mixture of solvents including water to the reaction mixture, and subjecting the aqueous reaction mixture to stirring for a second period of time, and heating at a temperature which is less than about 90° C. using microwaves;
   (c) allowing the aqueous reaction mixture to stand for a third period of time, thereby obtaining an oil phase comprising a treated oil and one or more phases including an aqueous phase;
   (d) subjecting the aqueous reaction mixture to separation thereby yielding the treated oil, wherein the removing agent is a phosphoric acid ester of general formula I below

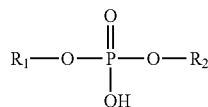

wherein $R_1$ and $R_2$ are each independently a $C_8$ to $C_{20}$ linear or branched, cyclic or non-cyclic, saturated or unsaturated alkyl group, optionally comprising a heteroatom which is O, S, or N;
- (e) washing the treated oil using a second mixture of solvents including water; and
- (f) retrieving a washed treated oil, wherein, optionally steps (e) and (f) is repeated one time or more, and wherein a composition of the first mixture of solvents at step (b) and the second mixture of solvents at step (e) is the same or is different, the first and second mixtures of solvent each independently comprises an alcohol which is ethanol.

2. A process according to claim 1, wherein:
- the treated oil is further subjected to steps (b) to (d), one time or more; and/or
- the treated oil is further subjected to steps (a) to (d), one time or more; and/or
- step (f) is conducted at ambient temperature, optionally steps (d) and (f) each independently comprises decantation, centrifugation, filtration, or a combination thereof; and/or
- a length of the first period of time at step (a) and the second period of time at step (b) is the same or is different; and/or
- the one or more phases obtained at step (c) comprise at least one phase comprising unreacted removing agent in an organic solvent, and wherein the unreacted removing agent is re-used at step (a); and/or
- the aqueous phase obtained at any of the steps is re-used in the process.

3. A process according to claim 1, wherein step (b) comprises use of a reflux system.

4. A process according to claim 1, wherein the aqueous phase obtained at step (c) comprises reacted removing agent, and wherein the reacted removing agent is further subjected to a regeneration treatment to yield the removing agent; optionally the regenerated removing agent is re-used at step (a); optionally the reacted removing agent comprises metal salts of the removing agent.

5. A process according to claim 4, wherein the regeneration treatment of the reacted removing agent comprises causing the treated reacted removing agent to react with an acid.

6. A process according to claim 1, wherein an amount of the removing agent is between about 0.1 vol. % to about 5 vol. % an amount of the petroleum oil.

7. A process according to claim 1, wherein other impurities in the petroleum oil are also removed.

8. A process according to claim 1, wherein the metal removing agent comprises di-(2-ethylhexyl)phosphoric acid (DEHPA or HDEHP) outlined below

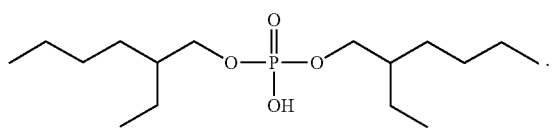

DEHPA or HDEHP

9. A process according to claim 8, wherein the temperature at step (a) is up to about 80° C.

10. A process according to claim 1, wherein the removing agent is selected from the group consisting of: di-(2-ethylhexyl) phosphoric acid, bis(2-ethylhexyl) hydrophosphoric acid, di-(2-ethylhexyl) orthophosphoric acid, O,O-bis(2-ethylhexyl)phosphoric acid, orthophosphoric acid 2-ethylhexyl alcohol, phosphoric acid di(2-ethylhexyl) ester and Hostarex PA 216™.

11. A process according to claim 1, wherein the removing agent is miscible to the petroleum oil.

12. A process according to claim 5, wherein the acid is HCl.

13. A process according to claim 7, wherein the metals and other impurities, as measured by Neuron Activation Analysis, comprise at least one of: Cd, U, Ca, V, Ti, Sn, Sr, Ag, Mn, Si, Al, Mg, Na, Fe, K, Zn, Cr, Cl, V, Co, Ni, Cu, As, Se, Br, Rb, Zr, Mo, In, Sn, Sb, I, Cs, Ba, La, Hf, W, Hg, Th, and Sc.

14. A process for removing metals in a petroleum oil material, comprising the steps of:
- (a) mixing the petroleum oil material with a removing agent which comprises a phosphoric acid ester and an aqueous solution, thereby obtaining a reaction mixture which is subjected to stirring for a first period of time, and heating at a temperature which is lower than the boiling point of the removing agent using microwaves;
- (b) adding a first mixture of solvents including water to the reaction mixture, and subjecting the aqueous reaction mixture to stirring for a second period of time, and heating at a temperature which is less than about 90° C. using microwaves;
- (c) allowing the aqueous reaction mixture to stand for a third period of time, thereby obtaining an oil phase comprising a treated oil and one or more phases including an aqueous phase; and
- (d) subjecting the aqueous reaction mixture to separation thereby yielding the treated oil, wherein the removing agent is a phosphoric acid ester of general formula I below

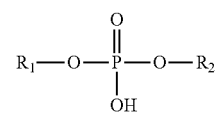

wherein $R_1$ and $R_2$ are each independently a $C_8$ to $C_{20}$ linear or branched, cyclic or non-cyclic, saturated or unsaturated alkyl group, optionally comprising a heteroatom which is O, S, or N, wherein the aqueous phase obtained at step (c) comprises reacted removing agent, and wherein the reacted removing agent is further subjected to a regeneration treatment to yield the removing agent; optionally the regenerated removing agent is re-used at step (a); optionally the reacted removing agent comprises metal salts of the removing agent, and wherein the regeneration treatment of the reacted removing agent comprises causing the treated reacted removing agent to react with an acid which is HCl.

* * * * *